(12) United States Patent
Tadros et al.

(10) Patent No.: US 7,297,409 B2
(45) Date of Patent: Nov. 20, 2007

(54) MULTILAYER, WEATHERABLE COMPOSITIONS AND METHOD OF MANUFACTURE THEREOF

(75) Inventors: Safwat E. Tadros, Evansvile, IN (US); Peter H. Th. Vollenberg, Bergen op Zoom (NL)

(73) Assignee: Sabic Innovative Plastics IP BV, Pittsfield, MA (US)

( * ) Notice: Subject to any disclaimer, the term of this patent is extended or adjusted under 35 U.S.C. 154(b) by 310 days.

(21) Appl. No.: 09/682,749

(22) Filed: Oct. 12, 2001

(65) Prior Publication Data

US 2003/0105276 A1    Jun. 5, 2003

(51) Int. Cl.
*B32B 27/36*   (2006.01)
*B38B 7/00*    (2006.01)

(52) U.S. Cl. .................. 428/480; 428/412; 427/133
(58) Field of Classification Search ............. 428/412, 428/480; 524/99, 100; 427/133
See application file for complete search history.

(56) References Cited

U.S. PATENT DOCUMENTS

| | | | |
|---|---|---|---|
| 2,465,319 A | 3/1949 | Whinfield et al. ............ 260/75 |
| 2,675,390 A | 4/1954 | Rosenblatt .................. 260/313 |
| 2,888,484 A | 5/1959 | Dehm et al. ................ 260/514 |
| 3,118,887 A | 1/1964 | Hardy et al. ................ 260/248 |
| 3,244,708 A | 4/1966 | Duennenberger et al. ... 260/248 |
| 3,423,360 A | 1/1969 | Huber et al. .................. 260/47 |
| 3,442,898 A | 5/1969 | Luethi et al. ................ 260/251 |
| 3,444,237 A | 5/1969 | Jaffe et al. .................. 260/468 |
| 3,635,895 A | 1/1972 | Kramer ........................ 260/47 |
| 4,001,184 A | 1/1977 | Scott ........................... 260/47 |
| 4,210,612 A | 7/1980 | Karrer ........................ 525/204 |
| 4,217,438 A | 8/1980 | Brunelle et al. ............ 528/202 |
| 4,619,956 A * | 10/1986 | Susi ............................. 524/87 |
| 4,754,064 A | 6/1988 | Lillwitz ....................... 562/509 |
| 4,895,901 A | 1/1990 | Ramey et al. ............... 525/127 |
| 4,895,981 A | 1/1990 | Reinert et al. .................. 8/565 |
| 5,015,682 A | 5/1991 | Galbo ......................... 524/102 |
| 5,298,067 A | 3/1994 | Valet et al. .................. 106/506 |
| 5,441,997 A | 8/1995 | Walsh et al. ................ 524/147 |
| 5,597,854 A | 1/1997 | Birbaum et al. ............ 524/100 |
| 5,736,597 A | 4/1998 | Birbaum et al. |
| 6,136,441 A | 10/2000 | MacGregor et al. ........ 428/412 |
| 6,239,276 B1 | 5/2001 | Gupta et al. ................ 544/213 |

FOREIGN PATENT DOCUMENTS

| | | |
|---|---|---|
| EP | 0 434 608 A1 | 11/1990 |
| EP | 0 458 741 A2 | 4/1991 |
| EP | 0 464 921 A1 | 6/1991 |
| EP | 0 483 488 A1 | 9/1991 |
| EP | 0595413 | 1/1998 |
| EP | 0900823 | 10/1999 |
| WO | WO 86/03528 | 6/1986 |
| WO | WO9819862 | 5/1998 |
| WO | WO9948685 | 9/1999 |
| WO | WO9957189 | 11/1999 |
| WO | WO0179340 | 10/2001 |

* cited by examiner

*Primary Examiner*—Thao Tran
(74) *Attorney, Agent, or Firm*—Marina Larson & Associates, LLC

(57) ABSTRACT

A weatherable composition comprising an upper layer that comprises a polymer system consisting essentially of a cycloaliphatic polyester resin, and an additive composition comprising an hindered amine light stabilizer and a low volatility, hydroxyphenyl triazine or pyrimidine UV absorber; an intermediate layer that comprises a polymer system consisting essentially of a cycloaliphatic polyester, and optionally, an additive composition comprising $TiO_2$, dyes, pigments, and special effects additives; and a polymeric substrate, wherein the intermediate layer is disposed between and in intimate contact with the upper layer and the substrate. The composition finds utility in articles such as automotive parts.

16 Claims, No Drawings

MULTILAYER, WEATHERABLE COMPOSITIONS AND METHOD OF MANUFACTURE THEREOF

BACKGROUND OF INVENTION

There is substantial commercial interest in the use of multilayer, weatherable polymeric materials in various product forms such as sheets, films, shaped products, thermoformed articles, packaging, and architectural products, as well as coatings. Many different plastics are used as the base layer, or substrate, in these products in order to take advantage of particular physical, chemical, and mechanical properties. The upper layer, often referred to as the topcoat, often functions to protect the base layer or layers, for example to maintain gloss and shine. However, curing and aging of the layers can result in a color shift, often described as yellowing. This color shift may be observed immediately upon manufacture, or gradually over time. When a white or light colored finish is desired, yellowing of the upper layer is aesthetically undesirable to consumers. Accordingly, there remains a need in the art for weatherable compositions, particularly upper coats, that provide protection to an underlying substrate, and that do not appreciably yellow during use.

SUMMARY OF INVENTION

A weatherable, multilayer composition comprises a upper layer comprising a polymer system consisting essentially of a cycloaliphatic polyester resin, and an additive composition comprising a hindered amine light stabilizer and a low volatility hydroxyphenyl-triazine or -pyrimidine UV absorber; an intermediate layer comprising a polymer system consisting essentially of a cycloaliphatic polyester, and optionally an additive composition comprising $TiO_2$, dyes, pigments, or special effects additives; and a polymeric substrate wherein the intermediate layer is disposed between, and in intimate contact with the upper layer and the substrate.

DETAILED DESCRIPTION

It has been unexpectedly found by the inventors hereof that a weatherable, non-yellowing multilayer composition maybe achieved by using specific formulations for the various layers as disclosed herein. An upper layer (most commonly a upper coat) comprises a cycloaliphatic polyester resin, and an additive composition comprising a hindered amine light stabilizer and a low volatility hydroxyphenyl-triazine or -pyrimidine UV absorber. An intermediate layer comprises a cycloaliphatic polyester resin and optionally, additives including titanium dioxide (hereinafter referred to as $TiO_2$), as well as dyes, pigments, and/or special surface effect additives. These two layers are disposed on a polymeric substrate, which preferably comprises polycarbonate and $TiO_2$.

Cycloaliphatic polyesters are preferred for use in the upper and intermediate layers, as they are characterized by optical transparency and improved weatherability when compared to many substrate compositions alone. Preferably, they also have improved chemical resistance and low water absorption when compared to the base substrate layer alone. In addition, cycloaliphatic polyester layers may also have melt compatibility with the substrate resin, allowing easy recycling of the multilayer structures through simple re-melting of the multilayer article and reforming one of the layers as a combination of the substrate and the cycloaliphatic layer. This attribute is in contrast to other layers known in the art, such as chlorinated polyolefins, which react upon re-melting to cause degradation of the base substrate layer resin, particularly if the base substrate layer resin is a high melting condensation polymer like polycarbonate as is used herein.

Cycloaliphatic polyesters suitable for use herein can be defined in many ways, including by method of preparation. For example, suitable cycloaliphatic polyesters may be prepared by reaction of a diol with a dibasic acid or derivative thereof, provided that at least a portion of the diol and/or the acid is cycloaliphatic. The diols useful in the preparation of suitable polyester resins are straight chain, branched, or cycloaliphatic, with straight chain or branched alkane diols containing at least 2 carbon atoms, and at most 12 carbon atoms on average. Examples of suitable diols include, but are not limited to, ethylene glycol, propylene glycol (i.e., 1,2- and 1,3-propylene glycol), butane diol (i.e., 1,3- and 1,4-butane diol), diethylene glycol, 2,2-dimethyl-1,3-propane diol,2-ethyl, 2-methyl, 1,3-propane diol, 1,3- and 1,5-pentane diol, di-propylene glycol, 2-methyl-1,5-pentane diol, 1,6-hexane diol, 1,4-cyclohexane dimethanol, triethylene glycol, 1,10-decane diol, mixtures of the foregoing, and the like.

Examples of preferred diols include dimethanol-bicyclooctane, and dimethanol decaline. Most preferred diols are in general cycloaliphatic diols or chemical equivalents thereof, in particular 1,4-cyclohexane dimethanol or a chemical equivalent thereof. In the instance when the preferred cycloaliphatic diol can contain a mixture of cis- and trans-isomers, a cis to trans ratio of at least about 1 to 4 cis/trans, and at most about 4 to 1 trans is preferred, a cis/trans ratio of about 1 to 3 cis/trans being most preferred. Also, chemical equivalents of diols include esters, such as dialkylesters, diaryl esters, and the like.

As mentioned above, suitable cycloaliphatic polyesters may be prepared by reaction of a diol with a dibasic acid or derivative. Di-acids (dibasic acids) useful in the preparation of suitable cycloaliphatic polyester resins have at least two carboxyl groups, each of which is attached to a saturated carbon in a saturated ring. A preferred diacid is 1,4-cyclohexanedicarboxylic acid and most preferred is trans-1,4-cyclohexanedicarboxylic acid as further explained above. Other examples of suitable cycloaliphatic acids include decahydro-naphthalene dicarboxylic acid, norbornene dicarboxylic acids, and bicyclo-octane dicarboxylic acids and salts thereof. Linear aliphatic diacids are useful herein provided the polyester has at least one monomer containing a cycloaliphatic ring. Examples of linear aliphatic diacids include, but are not limited to succinic acid, adipic acid, dimethyl succinic acid, azelaic acid and the like. Various mixtures of diacid and diols are also suitable for use herein to produce suitable cycloaliphatic polyesters.

Cyclohexanedicarboxylic acids and chemical equivalents thereof can be prepared, for example, by the hydrogenation of cycloaromatic diacids and corresponding derivatives such as isophthalic acid, terephthalic acid of naphthalenic acid in a suitable solvent. This process may also include preparation with water and/or acetic acid at room temperature and atmospheric pressure using suitable catalysts such as rhodium supported on a suitable carrier of carbon or alumina, as disclosed in Friefelder et al., *Journal of Organic Chemistry*, 31, 34-38 (1966); U.S. Pat. No. 2,675,390 to Roseneblatt, and U.S. Pat. No. 4,754,064 to Lillwitz. Cyclohexanedicarboxylic acids and chemical equivalents thereof may also be prepared by the use of an inert liquid medium using a catalyst of palladium or ruthenium in carbon or silica, wherein an acid is at least partially soluble under reaction conditions, as disclosed in U.S. Pat. No. 2,888,484 to Dekm et al. and U.S. Pat. No. 3,444,237 to Jaffe.

During hydrogenation, two or more isomers of cyclohexane dicarboxylic acids may be obtained, in which the carboxylic acid groups are in both the cis- and trans-positions. The cis- and trans-isomers can be separated by crystallization with or without a solvent, for example, n-heptane, or by distillation. Cis-isomers tend to provides better blending; however, trans-isomers tend to have higher melting and crystallization temperatures, either of which may be preferred depending on the end use. As such, mixtures of the cis- and trans-isomers of cyclohexanedicarboxylic acids are also useful herein. When a mixture of isomers and/or more than one diacid is used, a copolyester or a mixture of two polyesters may also be used as the cycloaliphatic polyester resin.

Chemical equivalents of these diacids include esters, alkyl esters, dialkyl esters, diaryl esters, anhydrides, acid chlorides, acid bromides, and the like. The preferred chemical equivalents comprise the dialkyl esters of the cycloaliphatic diacids. The most preferred chemical equivalent comprises dimethyl esters of the acid, particularly dimethyl-trans-1,4-cyclohexanedicarboxylate.

Dimethyl-1,4-cyclohexanedicarboxylate can be obtained by ring hydrogenation of dimethylterephthalate, wherein two isomers having the carboxylic acid groups in the cis- and trans-positions are obtained. The isomers can be separated, the trans-isomer being especially preferred. Mixtures of the isomers are suitable as explained above and preferably in the ratios as explained above.

Suitable polyester resins may also be identified structurally, and are typically obtained through the condensation or ester interchange polymerization of the above-described diol or diol equivalent component with the diacid or diacid chemical equivalent component, and having recurring units of formula 1:

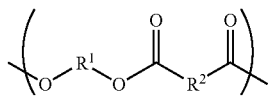

(1)

wherein $R^1$ is an alkyl or cycloaliphatic radical preferably containing at least 2 carbon atoms, and at most 12 carbon atoms on average, and which is the residue of a straight chain, branched, or cycloaliphatic alkane diol having at least 2 carbon atoms, and at most 12 carbon atoms on average, or chemical equivalents thereof, and $R^2$ is an alkyl or a cycloaliphatic radical, which is the decarboxylated residue derived from a diacid, with the proviso that at least one of $R^1$ or $R^2$ is a cycloalkyl group.

A preferred cycloaliphatic polyester is poly-1,4-cyclohexane-dimethanol-1,4-cyclohexanedicarboxylate (hereinafter referred to as PCCD), wherein $R^1$ and $R^2$ is a cyclohexylidene radical, and further wherein $R^2$ is derived from cyclohexanedicarboxylate or a chemical equivalent thereof, and is selected from the cis- or trans-isomer or a mixture of cis- and trans-isomers thereof.

Suitable cycloaliphatic polyester resins can be generally made as described in U.S. Pat. No. 2,465,319 to Whinfield et al. The reaction is generally conducted in the presence of a suitable catalyst such as, for example, tetra(2-ethyl hexyl) titanate, in a suitable amount, typically about 50 to 400 ppm of titanium based upon the final product.

Cycloaliphatic polyester resins may also contain catalyst quenchers (also known as stabilizers) that inhibit activity of any catalysts that may be present in the resins. Catalyst quenchers are described in detail in U.S. Pat. No. 5,441,997 to Walsh et al. Preferably, quenchers provide a transparent and colorless product. Quenchers are used at a concentration of at least about 0.001%, preferably at least about 0.005% by weight of the total layer or substrate. Quenchers are also used at a concentration of at most about 10%, preferably at most about 2% by weight of the total layer or substrate. Preferred quencher/stabilizers include an effective amount of an acidic phosphate salt; an acid, alkyl, aryl or mixed phosphite having at least one acidic hydrogen; a Group IB or Group IIB metal phosphate salt; a phosphorus oxo acid, a metal acid pyrophosphate or a mixture thereof and the like. The suitability of a particular compound for use as a stabilizer may be readily determined without under experimentation by one of skill in the art.

Useful acidic phosphate salts include sodium dihydrogen phosphate, mono zinc phosphate, potassium hydrogen phosphate, calcium dihydrogen phosphate and the like. The phosphites may have the formula $P(OR^3)(OR^4)(OR^5)$, wherein $R^3$, $R^4$ and $R^5$ are independently selected from the group consisting of hydrogen, alkyl and aryl with the proviso that at least one of $R^3$, $R^4$, and $R^5$ is hydrogen. The phosphate salts of a Group IB or Group IIB metal of the periodic table include zinc phosphate, copper phosphate, and the like. The phosphorus oxo acids include phosphorous acid, phosphoric acid, polyphosphoric acid or hypophosphorous acid. Suitable polyacid pyrophosphates are of the formula $M_xH_yP_nO_{3n+1}$, wherein M is a metal, x is from 1 to about 12, y is from 1 to about 12, n is from 2 to about 10, and the sum of x+y is equal to n+2. The preferred M is an alkaline or alkaline earth metal.

Preferred quenchers include oxo acids of phosphorous or acidic organo phosphorus compounds. Inorganic acidic phosphorus compounds may also be used as quenchers, with the most preferred quenchers being phosphoric or phosphorous acid.

Preferably, the upper layer comprises a polymer system that consists essentially of a cycloaliphatic polyester as described above. By this is meant that additional polymers may be present, but not any that would adversely impact the weathering of the weatherable composition, or the yellowing or discoloration of the weatherable composition, particularly over time, for example polycarbonate.

The upper layer further includes an additive composition that contains a combination of a hindered amine light stabilizers and a low volatility hydroxyphenyl-triazine or -pyrimidine UV absorber.

Useful hindered amine light stabilizers (hereinafter HALS) include substituted piperidine moieties and oligomers thereof, as disclosed in U.S. Pat. No. 4,895,901 to Ramey et al., U.S. Pat. No. 4,210,612 to Karrer, and U.S. Pat. No. 5,015,682 to Galbo. The preferred HALS is a 4-piperidinol derivative having the general formula (2):

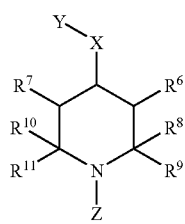

(2)

wherein X is oxygen, and Y is preferably hydrogen, or hydroxyalkyl, aminoalkyl, or alkyl substituted by both hydroxyl and amino groups, where the alkyl has up to about 20 carbon atoms on average, but may also represent a moiety compatible with the light stabilizing properties of the remainder of the molecule and that furnishes the requisite reactive group.

$R^6$ and $R^7$ are each independently selected from the group consisting of a hydrogen atom, an alkyl group, an alkenyl group, or an arylalkyl group. Preferably, $R^6$ and $R^7$ are each hydrogen. $R^8$, $R^9$, $R^{10}$, and $R^{11}$ are each independently selected from the group consisting of an alkyl group having 1 to about 6 carbon atoms, phenyl, an arylalkyl group, an aromatic heterocyclic group having 5 or 6 carbon atoms, and containing an oxygen, sulphur or nitrogen atom, or $R^8$, $R^9$, $R^{10}$, and $R^{11}$ respectively, together or with the carbon atom to which they are attached may represent a $C_5$ to $C_{12}$cycloalkyl group. Preferably, $R^8$, $R^9$, $R^{10}$, and $R^{11}$ are methyl.

Z is an oxy radical, an alkyl group, an alkenyl group, an alkoxyalkyl group, an arylalkyl group that is unsubstituted or which has one or more substituents in its aryl moiety, including, for example, 2,3-epoxypropyl. Z is preferably represented by the formula —$CH_2COOR^{12}$, wherein $R^{12}$ is an alkyl group, an alkenyl group, a phenyl group, an aryfalkyl group, or a cyclohexyl group. Most preferably, Z has the formula —$CH_2CH(R^{14})OR^{13}$, wherein $R^{14}$ is a hydrogen atom, a methyl group or a phenyl group and $R^{13}$ is a hydrogen atom, an alkyl group, an ester, a carbonyl, an acyl group, an aliphatic acyl group, or a group represented by the formula —$COOR^{15}$, or —$OOCR^{15}$, wherein $R^{15}$ is an alkyl group, a benzyl group, a phenyl group, and the like.

One preferred oligomeric HALS has formula (3):

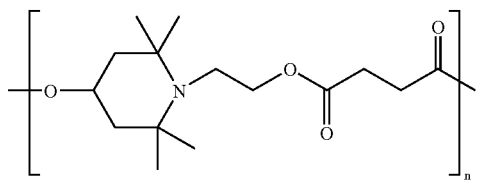

(3)

wherein n is on average greater than about 9, and less than about 12 (i.e., having a molecular weight from about 3100 to about 4000). This material is commercially available under the trade name TINUVIN 622 (CAS Number 065447-77-0, Ciba Specialty Chemicals, Inc., Basel Switzerland).

Another preferred oligomeric HALS has the general formula (4)

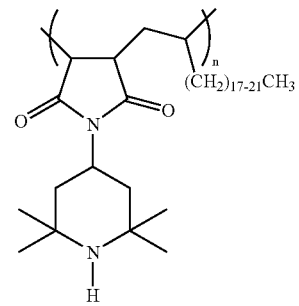

(4)

wherein n is on average greater than about 4, and less than about 7 (i.e., having a molecular weight from about 3000 to about 4000). One example of this type of HALS wherein n is on average greater than about 4 and less than about 7 is commercially available under the trade name UVINUL 5050H from BASF.

Another preferred hindered HALS has formula (5)

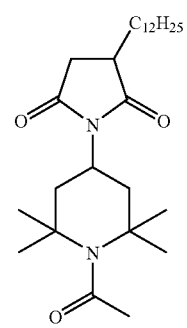

(5)

This HALS is commercially available under the trade name SANDUVOR 3058 from Clariant.

The HALS is present in the upper layer at a concentration greater than about 0.01%, preferably greater than about 0.1%, most preferably greater than about 0.5% by weight based on the total weight of the upper layer. The HALS is also present in the upper layer at a concentration less than about 10%, preferably less than about 2%, most preferably less than about 1.5% by weight based on the total weight of the upper layer.

In addition to the HALS, the additive composition in the first layer also comprises a low volatility hydroxyphenyl-triazine or pyrimidine UV absorber. Suitable low volatility hydroxyphenyl-triazine or -pyrimidine UV absorbers include compounds having a 2,4,6-trisaryl-1,3,5-triazine or 2,4,6-trisaryl-1,3-pyrimidine group, and which further contain free hydroxyl groups. Such compounds are known, being described, for example, in U.S. Pat. No. 3,118,887 to Johns et al., U.S. Pat. No. 3,244,708 to Duennenberger et al., U.S. Pat. No. 3,423,360 to Huber et al., WO 86/3528, U.S. Pat. No. 4,831,068 to Reinert et al., EP-A-434 608, EP-A-458 741, EP-A-483 488, U.S. Pat. No. 5,298,067 to Valet, U.S. Pat. No. 3,442,898 to Luethi et al., and U.S. Pat. No. 4,895,981 to Reinert et al.

The preferred UV absorbers comprise pyrimidines and triazines having two phenyl groups, and a resorcinol or substituted resorcinol group attached to the triazine or pyrimidine ring, as disclosed in U.S. Pat. No. 6,239,276 B1 to Gupta et al. and U.S. Patent No. 5,597,854 to Birbaum et al. Suitable low volatility hydroxyphenyl-triazine UV absorbers are generally represented by formula (6):

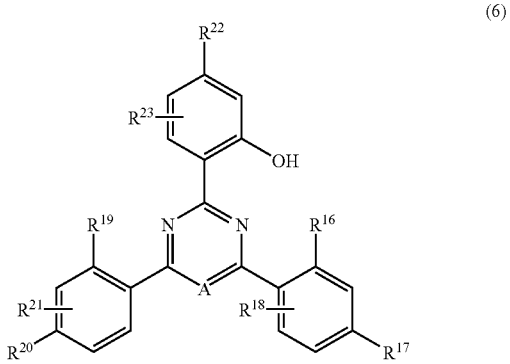

(6)

wherein A is N or CH; and $R^{16}$, $R^{17}$, $R^{18}$, $R^{19}$, $R^{20}$, $R^{21}$, $R^{22}$ and $R^{23}$ are each independently selected from the group consisting of hydrogen, alkyl, cycloalkyl, halogen, haloalkyl, alkoxy, alkylene, aryl, alkyl-aryl, or a combination thereof. Preferably, the low volatility hydroxyphenyl-triazine UV absorber has formula (7):

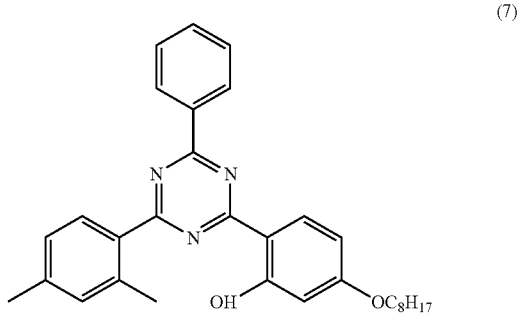

(7)

This material is commercially available under the trade name TINUVIN 1577 (CAS Number 147315-50-2, Ciba Specialty Chemicals, Inc., Basel Switzerland). Another example of a preferred low volatility hydroxyphenyl-triazine UV absorber has formula (8):

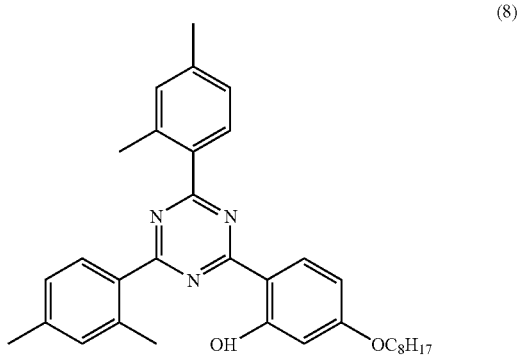

(8)

This material is commercially available under the trade name CYASORB UV-1164, from Cytec Industries.

The hydroxyphenyl-triazine or -pyrimidine UV absorbers are present in the upper layer at a concentration greater than about 0.01%, preferably greater than about 0.1%, most preferably greater than about 0.2% by weight, based on the total weight of the upper layer. Hydroxyphenyl-triazine or-pyrimidine UV absorbers are furthermore present in the upper layer at a concentration less than about 10%, preferably less than about 3%, most preferably less than about 2.5% by weight, based on the total weight of the upper layer.

The thickness of the upper layer is determined by a number of factors, for example the degree of weatherability required, the cost of the materials, the method of manufacture, and the like, but typically has a thickness greater than about 0.1 mils, preferably greater than about 2 mils, most preferably greater than about 5 mils on average. Also, the first layer has a thickness less than about 50 mils, preferably less than about 30 mils, most preferably less than about 20 mils on average.

The intermediate layer also comprises a polymer system that consists essentially of a cycloaliphatic polyester described above, and optionally $TiO_2$, dyes, pigments, and/or special effects additives. $TiO_2$ suitable for use herein has an average particle size greater than about 0.01 microns, preferably greater than about 0.2 microns. Also, suitable $TiO_2$, has an average particle size less than about 1 micron, preferably less than about 0.4 microns. The $TiO_2$ when used, is present in the intermediate layer in an amount greater than about 1%, preferably greater than about 3% by weight of the total layer on average. When used, the $TiO_2$ is present in the intermediate layer in an amount less than about 12%, preferably less than about 10% by weight of the total layer on average.

The thickness of the intermediate layer is also dependent on a number of factors as described above, but is generally greater than about 2 mils, preferably greater than about 3 mils, most preferably greater than about 5 mils on average. The intermediate layer also has a thickness less than about 30 mils, preferably less than about 20 mils, most preferably less than about 15 mils on average.

The intermediate layer may further comprise additional additives such suitable dyes, pigments, and special effects additives as is known in the art, as well as mold release agents, antioxidants, lubricants, nucleating agents such as talc and the like, other stabilizers including but not limited to UV stabilizers, such as benzotriazole, supplemental reinforcing fillers, and the like, flame retardants, pigments or combinations thereof.

The substrate, disposed in contact with the intermediate layer on a surface opposite the first layer, may be in the form of a film (for example, a layer about 1 to about 50 mils thick) or an article. The substrate comprises a polymeric material (plastic) known in the art. Advantageously, the plastic comprises titanium dioxide as described above and polycarbonate. The term "polycarbonate" and/or "polycarbonate composition" includes compositions having structural units of formula 9:

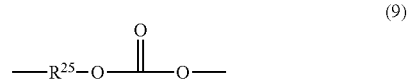

(9)

wherein $R^{25}$ is aromatic organic radicals and/or aliphatic, alicyclic, or heteroaromatic radicals. Preferably, $R^{25}$ is an aromatic organic radical and, more preferably, a radical having the formula -$A^1$—$Y^1$-$A^2$-wherein each of $A^1$ and $A^2$ is a monocyclic divalent aryl radical and $Y^1$ is a bridging radical having one or more atoms which separate $A^1$ from $A^2$. In an exemplary embodiment, one atom separates $A^1$ from $A^2$. Illustrative non-limiting examples of radicals of this type include: —O—, —S—, —S(O)—, —S($O_2$)—, —C(O)—, methylene, cyclohexyl-methylene, 2-[2.2.1]-bicycloheptylidene, ethylidene, isopropylidene, neopentylidene, cyclohexylidene, cyclopentadecylidene, cyclododecylidene, adamantylidene, and the like. The bridging radical $Y^1$ can be a hydrocarbon group or a saturated hydrocarbon group such as methylene, cyclohexylidene, or isopropylidene.

Suitable polycarbonates can be produced by the interfacial reaction of dihydroxy compounds in which only one atom separates $A^1$ and $A^2$. As used herein, the term "dihydroxy compound" includes, for example, bisphenol compounds having generally formula 10:

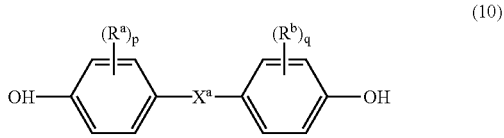

(10)

wherein $R^a$ and $R^b$ beach represent a halogen atom or a monovalent hydrocarbon group and may be the same or different; p and q are each independently integers from 0 to 4; and $X^a$ is one of the groups of formula 11:

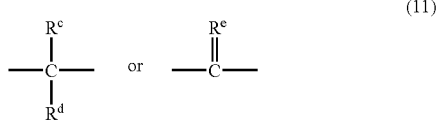

(11)

wherein $R^c$ and $R^d$ each independently represent a hydrogen atom or a monovalent linear or cyclic hydrocarbon group and $R^e$ is a divalent hydrocarbon group.

Some illustrative, non-limiting examples of suitable dihydroxy compounds include the dihydroxy-substituted aromatic hydrocarbons disclosed by name or formula (generic or specific) in U.S. Pat. No. 4,217,438. A nonexclusive list of specific examples of the types of bisphenol compounds represented by formula 11 includes: 1,1-bis(4-hydroxyphenyl) methane; 1,1-bis(4-hydroxyphenyl) ethane; 2,2-bis(4-hydroxyphenyl) propane (hereinafter "bisphenol A" or "BPA"); 2,2-bis(4-hydroxyphenyl) butane; 2,2-bis(4-hydroxyphenyl) octane; 1,1-bis(4-hydroxyphenyl) propane; 1,1-bis(4-hydroxyphenyl) n-butane; bis(4-hydroxyphenyl) phenylmethane; 2,2-bis(4-hydroxy-1-methylphenyl) propane; 1,1-bis(4-hydroxy-t-butylphenyl) propane; bis(hydroxyaryl) alkanes such as 2,2-bis(4-hydroxy-3-bromophenyl) propane; 1,1-bis(4-hydroxyphenyl) cyclopentane; and bis(hydroxyaryl) cycloalkanes such as 1,1-bis(4-hydroxyphenyl) cyclohexane.

Two or more different dihydric phenols or a copolymer of a dihydric phenol with a glycol or with a hydroxy (—OH) or acid-terminated polyester may be employed, or with a dibasic acid or hydroxy acid, in the event a carbonate copolymer rather than a homopolymer may be desired for use. Polyarylates and polyester-carbonate resins or their blends can also be employed. Branched polycarbonates are also useful, as well as blends of linear polycarbonate and a branched polycarbonate. The branched polycarbonates may be prepared by adding a branching agent during polymerization.

Suitable branching agents include polyfunctional organic compounds containing at least three functional groups, which may be hydroxyl, carboxyl, carboxylic anhydride, haloformyl, and mixtures thereof. Examples include, but are not limited to trimellitic acid, trimellitic anhydride, trimellitic trichloride, tris-p-hydroxy phenyl ethane, isatin-bisphenol, 1,3,5-tris((p-hydroxyphenyl)isopropyl)benzene, 4(4 (1,1-bis(p-hydroxphenyl)-ethyl, alpha,alpha-dimethyl benzyl)phenol, 4-chloroformyl phthalic anhydride, trimesic acid and benzophenone tetracarboxylic acid. Branching agents may be added at a level greater than about 0.05%. The branching agents may also be added at a level less than about 2.0% by weight of the total. Branching agents and procedures for making branched polycarbonates are described in U.S. Pat. No. 3,635,895 to Kramer, and U.S. Pat. No. 4,001,184 to Scott.

Preferred polycarbonates are based on bisphenol A, in which each of $A^1$ and $A^2$ of Formula 9 is p-phenylene and $Y^1$ is isopropylidene. The average molecular weight of the polycarbonate is greater than about 5,000, preferably greater than about 10,000, most preferably greater than about 15,000. In addition, the average molecular weight is less than about 100,000, preferably less than about 65,000, most preferably less than about 45,000 g/mol.

The plastic, particularly the polycarbonate, may include various additives incorporated in the resin. Such additives include, for example, fillers, reinforcing agents, heat stabilizers, antioxidants, plasticizers, antistatic agents, mold releasing agents, additional resins, blowing agents, and the like, such additional additives being readily determined by those of skill in the art without undue experimentation. Examples of fillers or reinforcing agents include glass fibers, asbestos, carbon fibers, silica, talc, and calcium carbonate. Examples of heat stabilizers include triphenyl phosphite, tris-(2,6-dimethylphenyl)phosphite, tris-(mixed mono-and di-nonylphenyl)phosphite, and dimethylbenene phosphonate and trimethyl phosphate. Examples of antioxidants include octadecyl-3-(3,5-di-tart-bull-4-hydroxyphenyl)propitiate, and pentaerythrityl-tetrakis[3-(3,5-di-tart-bull-4-hydroxyphenyl)propitiate]. Examples of plasticizers include dioctyl-4,5-epoxy-hexahydrophthalate, tris-(octoxycarbonylethyl)isocyanurate, tristearin, and epoxidized soybean oil. Examples of antistatic agents include glycerol monostearate, sodium stearyl sulfonate, and sodium dodecylbenzenesulfonate. Examples of mold releasing agents include stearyl stearate, beeswax, montan wax, and paraffin wax. Examples of other resins include but are not limited to polypropylene, polystyrene, polymethyl methacrylate, and polyphenylene oxide. Individual, as well as combinations of the foregoing may be used. Such additives may be mixed at a suitable time during the mixing of the components for forming the composition.

The substrate may contain $TiO_2$. When used, $TiO_2$ is present in the substrate in an amount greater than about 1%, preferably greater than about 3% by weight, based on the total weight of the substrate. When used, $TiO_2$ is present in the substrate in an amount less than about 12%, preferably less than about 10% by weight of the total layer on average. When used in the form of a film the substrate has a thickness greater than about 0.5 mil, preferably greater than about 2 mils, most preferably greater than about 5 mils on average, and a thickness less than about 70 mils, preferably less than about 50 mils, most preferably less than about 30 mils on average.

The compositions used to manufacture each layer (or the substrate) may be formed by techniques known in the art, for example melt blending the ingredients in powder or granular form, extruding the blend and comminuting into pellets or other suitable shapes; or dry mixing the ingredients, followed by mixing in the melted state in an extruder.

The method of processing the compositions into films can be carried out by conventional film extrusion techniques, for example, by melting the different materials of the different layers in separate extruders and conveying those materials to a die where these different materials are combined into a film with a layered structure. Also included are blow molding and injection molding of the various layers.

The compositions unexpectedly provide an enhanced combination of weatherability and heat aging properties, particularly as to yellowing or discoloration and gloss. Articles comprising the above-described composition accordingly have a change color (expressed in dE) of less than about 3, preferably less than about 2, and most preferably less than about 1.5 after 3000 hours of weathering according to the ISO4892-2A protocol. The compositions furthermore have a gloss (measured at an angle of 60 degrees) of more than about 60%, preferably more than about 70%, and more preferably more than about 80% and a change in gloss of less than about 20%, preferably less than about 15%, and more preferably less than about 10% after 3000 hours of weathering according to the ISO4892-2A protocol.

Alternatively, articles comprising the above-described composition have a change in color (expressed in dE) of less than about 2, preferably less than about 1.5, and most preferably less than about 1 after heat aging at 80° C. for three months. The compositions furthermore have a gloss (measured at an angle of 60 degrees) of more than about 75%, preferably more than about 80%, and more preferably more than about 85% and have a change in gloss of less than about 15%, preferably less than about 10%, and more preferably less than about 5% after heat aging at 80° C. for three months.

The weatherable compositions are suitable for a wide variety of uses, for example in automotive applications such as body panels, cladding, and mirror housings; in recreational vehicles including such as golf carts, boats, and jet skies; and in applications for building and construction, including, for example, outdoor signs, ornaments, and exterior siding for buildings.

The closure is further illustrated by the following non-limiting examples. All patents and references cited herein are incorporated by reference in their entirety.

EXAMPLES

In the following examples, multilayer compositions were back molded using a polycarbonate substrate layer as set forth in Table 1. Example 1 represents a non-limiting embodiment of the multilayer composition disclosed herein, and is compared to other multilayer substrates (Examples 2-9), some of which are previously disclosed or known in the art. Samples 8 and 9 are commercially available. Comparative examples 2-9 are submitted for purposes of evaluation only.

sample compositions referring to PCCD indicate 100% PCCD, while samples referring to PCCD/PC indicate a material having a ratio of 70 weight % PCCD and 30 weight % polycarbonate (hereinafter PC). Where indicated, "UV1" indicates that the layer has 0.15 weight % CYASORB UV-5411 (available from Cytec, West Paterson, N.J. U.S.A.), whereas "UV2" indicates that the layer has 0.50 weight % Tinuvin 1577 and 0.50 weight % Tinuvin 622 in accordance with that disclosed herein.

TABLE 1

| | Upper Layer | | Intermediate Layer | | Substrate | |
|---|---|---|---|---|---|---|
| No. | Composition | Thickness, mils | Composition | Thickness, mils | Composition | Thickness, mils |
| 1 | PCCD/UV2 | 10 | PCCD/TiO$_2$ | 10 | PC/TiO$_2$ | 10 |
| 2 | PCCD/UV1 | 10 | PCCD/TiO$_2$ | 10 | PC/TiO$_2$ | 10 |
| 3 | PCCD/UV2 | 10 | PCCD-PC/TiO$_2$ | 10 | PC/TiO$_2$ | 10 |
| 4 | PCCD-PC/UV1 | 10 | PCCD-PC/TiO$_2$ | 10 | PC/TiO$_2$ | 10 |
| 5 | PCCD-PC/UV2 | 10 | PCCD-PC/TiO$_2$ | 10 | PC/TiO$_2$ | 10 |
| 6 | PCCD/UV2 | 10 | None | — | PC/TiO$_2$ | 20 |
| 7 | PCCD-PC/UV2 | 10 | None | — | PC/TiO$_2$ | 20 |
| 8 | SOLLX[1] | 10 | None | — | PC/TiO$_2$ | 20 |
| 9 | KORAD[2] | 10 | None | — | PC/TiO$_2$ | 20 |

[1]Sollx is a polyester-polycarbonate resin available from General Electric Plastics, Pittsfield, Ma. USA
[2]An acrylic film available under the trade name KORAD from Polymer Extruded Products, Inc., Newark, New Jersey U.S.A.

Evaluation of the above samples is presented in Table 2 below. Weathering was evaluated using ISO4892-2A. Heat aging was evaluated by placing the sample in an air circulation oven at 80° C. for three months. These tests were then followed by evaluation of gloss, gloss retention (dGloss) and color measurements. Gloss values were measured using ASTM D523 at a measurement angle of 60 degrees. The color test measures color of the weathered sample using a Cielab System, expressed in L, a and b values. The color change dE is calculated from the L, a and b values measured before and after the weathering test.

TABLE 2

| ano. | Gloss 60 | Color | | | Weathering | | | | Heat Aging, 3 months at 80° C. | | |
|---|---|---|---|---|---|---|---|---|---|---|---|
| | | L | a | b | Hours | dE | Gloss | d Gloss | dE | Gloss | d Gloss |
| 1 | 90 | 95.8 | −0.6 | 3.7 | 500 | 0.5 | 88 | −2 | 0.6 | 93 | 3 |
| | | | | | 2000 | 0.5 | 91 | 1 | | | |
| | | | | | 3000 | 1.1 | 84 | −6 | | | |
| 2 | 90 | 95.3 | −0.5 | 3.9 | 500 | 1.0 | 88 | −2 | 0.9 | 91 | 2 |
| | | | | | 2000 | 4.4 | 53 | −37 | | | |
| | | | | | 3000 | 5.2 | 15 | −75 | | | |
| 3 | 93 | 97.4 | −0.5 | 2.6 | 500 | 0.5 | 92 | −1 | 0.3 | 97 | 4 |
| | | | | | 2000 | 2.7 | 60 | −33 | | | |
| | | | | | 3000 | 2.6 | 32 | −60 | | | |
| 4 | 94 | 97.3 | −0.5 | 2.7 | 500 | 3.1 | 93 | −1 | 1.0 | 96 | 2 |
| | | | | | 2000 | 8.8 | 31 | −62 | | | |
| | | | | | 3000 | 10 | 4 | −90 | | | |
| 5 | 93 | 97.3 | −0.5 | 2.7 | 500 | 0.7 | 89 | −4 | 0.3 | 91 | −1 |
| | | | | | 2000 | 2.7 | 25 | −68 | | | |
| | | | | | 3000 | 3.3 | 5 | −88 | | | |
| 6 | 101 | 97.0 | −0.7 | 3.1 | 500 | 0.9 | 97 | −4 | 0.7 | 97 | −4 |
| | | | | | 2000 | 1.2 | 40 | −61 | | | |
| | | | | | 3000 | 1.2 | 33 | −68 | | | |
| 7 | 95 | 96.9 | −1.0 | 3.5 | 500 | 0.9 | 90 | −4 | 1.2 | 90 | −4 |
| | | | | | 2000 | 3.5 | 83 | −12 | | | |
| | | | | | 3000 | 5.0 | 68 | −27 | | | |
| 8 | 104 | 95.9 | −0.8 | 5.4 | 500 | 10 | 102 | −1 | 1.0 | 95 | −8 |
| | | | | | 2000 | 12 | 105 | 1 | | | |
| | | | | | 3000 | 13 | 109 | 6 | | | |
| 9 | 87 | 96.9 | −1.0 | 3.5 | 500 | 0.6 | 88 | 1 | 1.4 | 70 | −17 |
| | | | | | 2000 | 0.7 | 76 | −11 | | | |
| | | | | | 3000 | 0.9 | 50 | −37 | | | |

Example 1 clearly demonstrates the benefits of the multilayer composition disclosed herein. Under the test conditions, Example 1 demonstrates an increased level of weatherability and heat aging than would be expected by one of ordinary skill in the art in view of the comparative examples. Specifically, UV2 package protects better against color shift than UV1, (compare e.g. sample 2 with samples 1, 3 and 6, and compare sample 4 with samples 5 and 7.) The presence of polycarbonate in the upper layer also leads to a larger color shift (compare sample 2 with sample 4, and compare samples 1 and 3 with samples 5, and 7).

The composition of the intermediate layer between the upper layer and the base substrate layer also affects color shift and gloss retention, wherein PCCD alone demonstrates an unexpected improvement compared to PCCD/PC and PC alone (compare samples 1 with samples 3, 5, 6 and 7). This is true even though gloss retention of the top layer is thought to be related to erosion phenomena at the exposed surface, which phenomena would not be expected to be affected by the composition of the intermediate layer.

In addition, although PCCD has a glass transition temperature ($T_g$) of about 60° C., unexpectedly the heat aging characteristics at 80° C. of Example 1 are superior to Sollx, which has a $T_g$ of about 145° C., as well as an upper layer of acrylic.

Accordingly, the compositions disclosed herein provide for weatherable finishes, and in particular outer finishes that provide protection to an underlying surface or base substrate. Such compositions aid in maintaining gloss and shine, and furthermore do not appreciably yellow during use.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A layered composition comprising:
   an upper layer consisting essentially of:
   (a) a polymer system consisting essentially of a cycloaliphatic polyester; and
   (b) 0.01 to 10% by weight of a low volatility hydroxyphenyl-triazine or -pyrimidine UV absorber that contains a 2,4,6-trisaryl-1,3,5-triazine moity and a free hydroxyl group, or that contains a 2,4,6-trisaryl-1,3-pyrimidine moiety and a free hydroxyl group or a mixture thereof; and
   (c) 0.01 to 10% by weight of a hindered amine light stabilizer;
   an intermediate layer consisting essentially of a polymer system of a cycloaliphatic polyester and optionally one or more materials selected from the group consisting of TiO2, dyes, pigments and special effects additives; and
   a polymeric substrate, wherein the intermediate layer is disposed between and in intimate contact with the upper layer and the polymeric substrate, wherein said cycloaliphatic polyester in the upper and intermediate layers has recurring units of the formula:

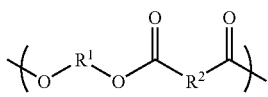

wherein $R^1$ and $R^2$ are each a cyclohexylidene, and
wherein said hindered amine light stabilizer comprises a substituted piperidine moiety or an oligomer substituted piperidine moiety, or has the formula:

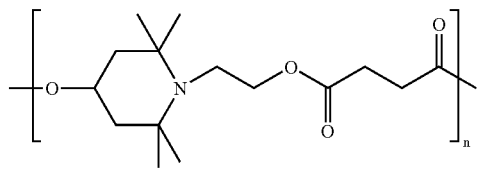

wherein n is on average greater than 9, and less than 12, by the formula:

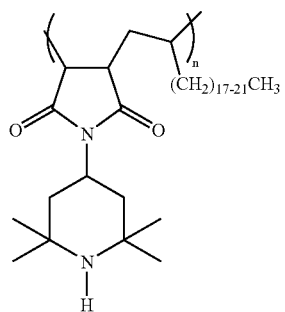

wherein n is on average greater than 4, and less than 7, by the formula:

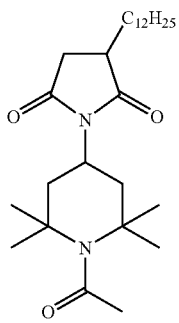

or a mixture comprising at least one of the foregoing hindered amine light stabilizers, and
wherein the cycloaliphatic polyester in the upper and intermediate layers is poly-1,4-cyclohexane-dimethanol-1,4-cyclohexanedicarboxylate.

2. The composition of claim 1, wherein said hindered amine light stabilizer is a 4-piperidinol derivative having the general formula

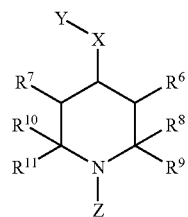

wherein X is oxygen; Y is hydrogen, hydroxyalkyl, aminoalkyl, or alkyl substituted by both hydroxyl and amino groups, where the alkyl moiety when present in Y has up to 20 carbon atoms; $R^6$ and $R^7$ are each independently selected from the group consisting of hydrogen, an alkyl group, an alkenyl group, and an arylalkyl group; $R^8$, $R^9$, $R^{10}$, and $R^{11}$ are each independently selected from the group consisting of an alkyl group having 1 to 6 carbon atoms, phenyl, an arylalkyl group, and an aromatic heterocyclic group having 5 or 6 carbon and containing an oxygen, sulphur or nitrogen atom, or $R^8$, $R^9$, $R^{10}$, and $R^{11}$ respectively, together or with the carbon atom to which they are attached are a $C_5$ to $C_{12}$ cycloalkyl group; and Z is an oxy radical, an alkyl group, an alkenyl group, an alkoxyalkyl group, or an arylalkyl group that is unsubstituted or which has one or more substituents in its aryl moiety.

3. The composition of claim 1, wherein said hindered amine light stabilizer is present in an amount greater than 0.1% by weight, and less than 10% by weight of the total weight of said upper layer.

4. The composition of claim 1, wherein said low volatility hydroxyphenyl-triazine or -pyrimidine UV absorber has the formula:

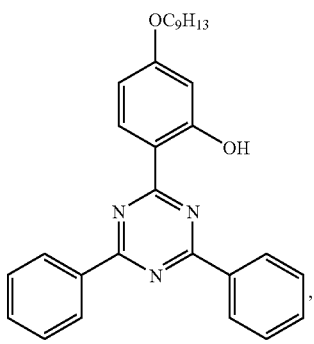

or the formula:

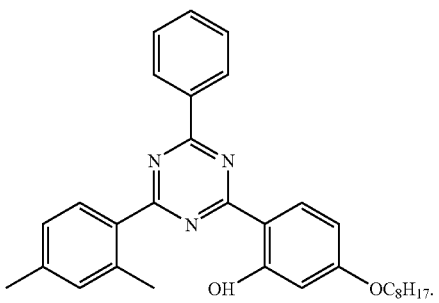

5. The composition of claim 1, wherein the substrate comprises polycarbonate.

6. The composition of claim 1, wherein the substrate is in the form of a film.

7. An article comprising the composition of claim 6.

8. The composition of claim 1 having a gloss measured at an angle of 60 degrees of more than 60%, a change in gloss of less than 20% after 3000 hours of weathering according to the ISO4892-2A protocol, and a change in color of less than 3 after 3000 hours of weathering according to the ISO4892-2A protocol.

9. The composition of claim 8 wherein the gloss is greater than 70%, the change in gloss is less than 15%, and the change in color is less than 2.

10. The composition of claim 8, wherein the gloss is greater than 80%, the change in gloss is less than 10%, and the change in color is less than 1.

11. The composition of claim 8, wherein the gloss is greater than 85%, the change in gloss is less than 5%, and the change in color is less than 1.

12. The composition of claim 1 having a gloss measured at an angle of 60 degrees of more than 75%, a change in gloss of less than 15% after heat aging at 80° C. for three months, and a change in color of less than 2 after heat aging at 80° C. for three months.

13. The composition of claim 12 wherein the gloss is greater than 80%, the change in gloss is less than 10%, and the change in color is less than 1.5.

14. An article comprising the composition of claim 1.

15. A method for the manufacture of a multilayer article, comprising blow molding the composition of claim 1.

16. The composition of claim 1, wherein the low volatility hydroxyphenyl-triazine or -pyrimidine UV absorber is a mixture of a compound of the formula:

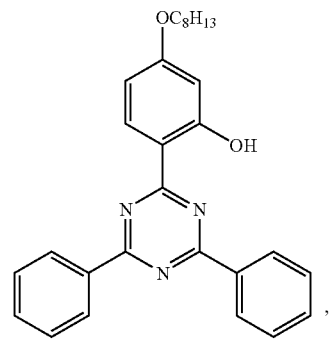

and a compound of the formula:

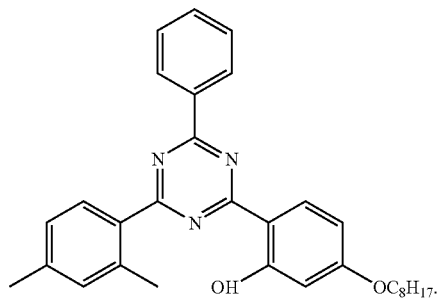

* * * * *

UNITED STATES PATENT AND TRADEMARK OFFICE
CERTIFICATE OF CORRECTION

PATENT NO. : 7,297,409 B2
APPLICATION NO. : 09/682749
DATED : November 20, 2007
INVENTOR(S) : Tadros et al.

It is certified that error appears in the above-identified patent and that said Letters Patent is hereby corrected as shown below:

Column 16, Claim 4, lines 33 - 49 should read: --The composition of claim 1, wherein said low volatility hydroxyphenyl-triazine or –pyrimidine UV absorber has the formula:

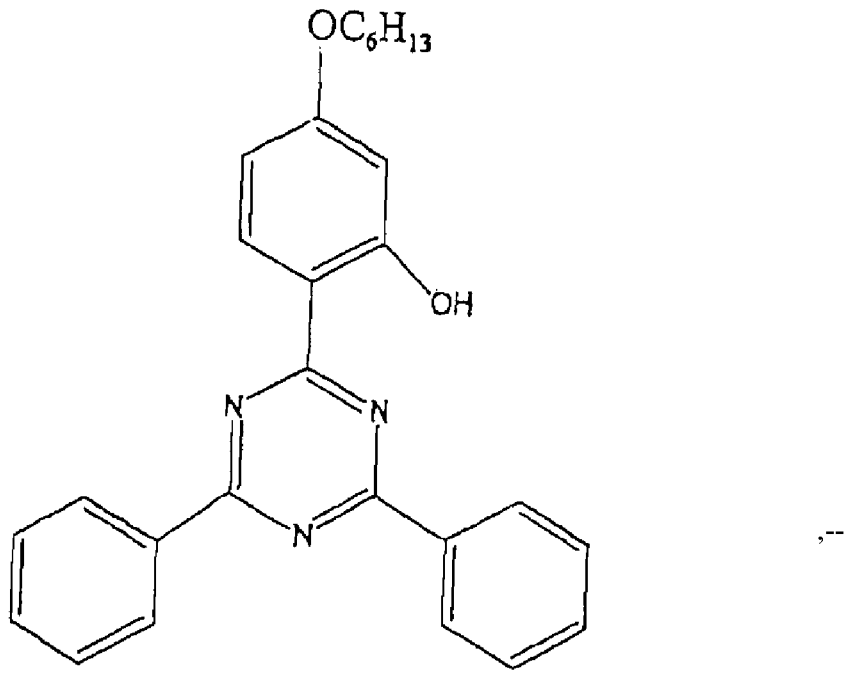

,--

UNITED STATES PATENT AND TRADEMARK OFFICE
CERTIFICATE OF CORRECTION

PATENT NO. : 7,297,409 B2
APPLICATION NO. : 09/682749
DATED : November 20, 2007
INVENTOR(S) : Tadros et al.

It is certified that error appears in the above-identified patent and that said Letters Patent is hereby corrected as shown below:

Column 18, Claim 16, the formula on Lines 1-15 should be as follows:

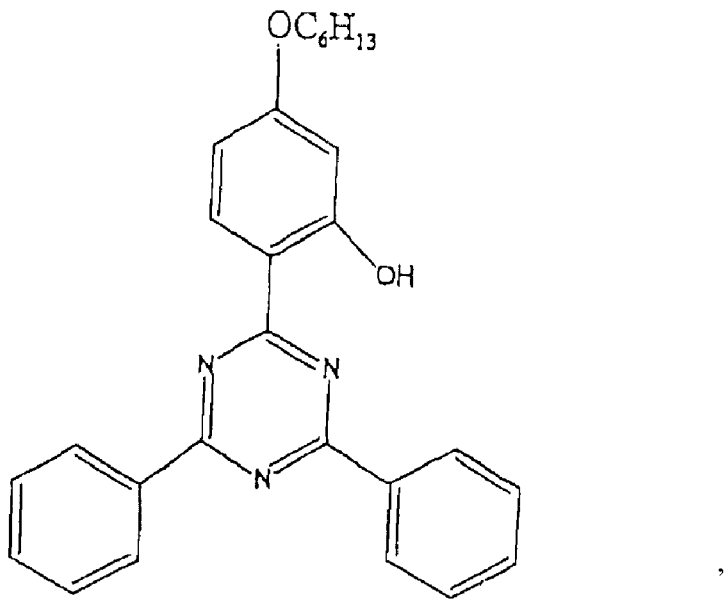

,

Signed and Sealed this

Fifteenth Day of April, 2008

JON W. DUDAS
*Director of the United States Patent and Trademark Office*